Jan. 19, 1960  S. K. STAUTH  2,921,666
FEEDER TROUGH FOR CONVEYORS
Filed April 23, 1957
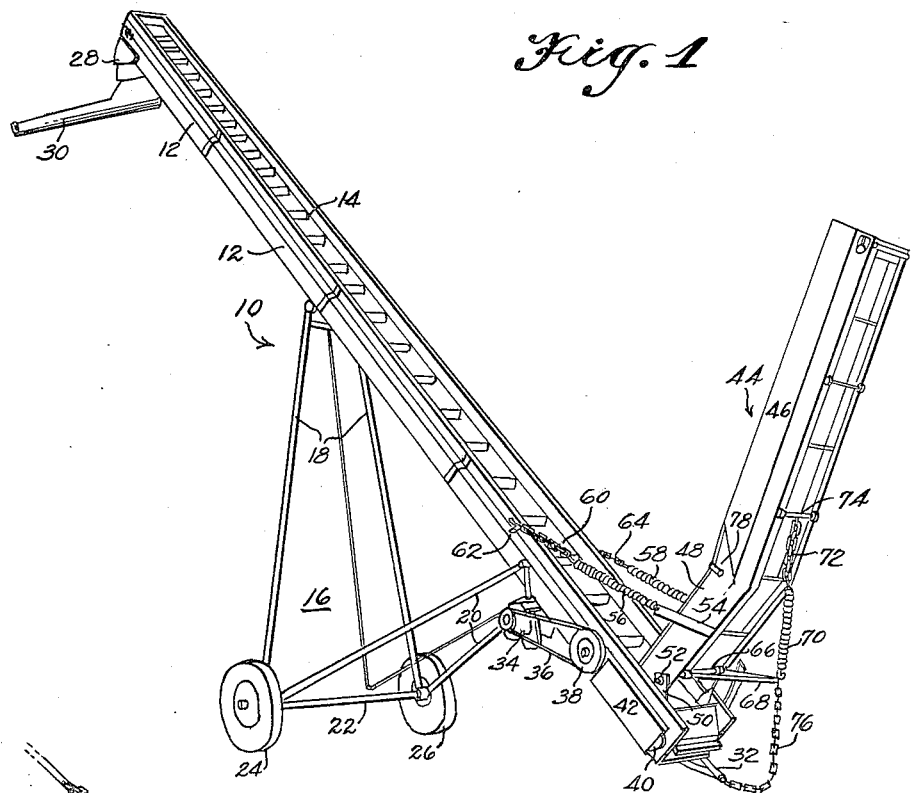
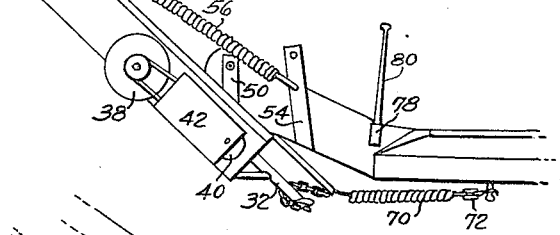
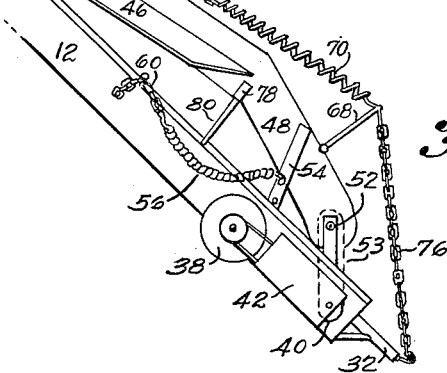
INVENTOR:
S. K. STAUTH
BY Homer R. Montague
ATTORNEY United States Patent Office 2,921,666
Patented Jan. 19, 1960

2,921,666

FEEDER TROUGH FOR CONVEYORS

Samuel K. Stauth, Compton, Ill., assignor to Moyrath Machinery Co., Inc., a corporation of Kansas Application April 23, 1957, Serial No. 654,561

1 Claim. (Cl. 198—98)

This invention relates generally to conveyor apparatus and more particularly to feeder troughs for endless conveyor machines.

In movable type agricultural machines such as small grain elevators or the like, where the entire apparatus must be capable of being moved or towed from place to place by truck or other vehicle, the apparatus must also be capable of operation in a variety of positions and angles for different types of farm products or for different purposes and locations.

It is an object of this invention to provide a feeder trough for an endless conveyor which, together with the conveyor, will form a compact unit capable of being folded and easily transported from place to place.

It is another object of this invention to provide an endless conveyor system and feed trough which is a unit capable of being folded easily by one person and capable of being moved from place to place by an ordinary truck or vehicle.

It is still another object of this invention to provide a feeder trough for an endless conveyor that may be used with a variety of conveyors or may be used with a single conveyor as a unitary structure.

Another object of this invention is to provide a feeder trough which is capable of quick and simple adjustment to either an operative or inoperative position relative to the conveyor to which it is connected.

Still another object of this invention is to provide a feeder trough assembly that may be easily adjusted to maintain the correct balance for either an operative or inoperative position relative to the conveyor to which it is connected.

Still another object of this invention is to provide a conveyor and feed trough in which the feed trough is hinged or pivoted to the conveyor and is balanced through a wide angular range relative to the conveyor by a plurality of springs which come into use depending upon the angular position of the feeder trough relative to the conveyor.

It is another object of this invention to provide a feeder trough for a main conveyor in which the feeder trough is capable of a wide range of angular movement with respect to the main conveyor from a fully operative position to an inoperative position fully folded upon the main conveyor, the feeder trough being in a balanced condition throughout the entire range of angular movement with respect to the main conveyor.

It is still another object of this invention to provide a balancing structure for a trough rotatably connected to a main conveyor so that the trough may be easily adjusted from an operative position to an inoperative position fully folded upon the main conveyor, the balancing structure being such that it is adjustable for different operating positions of the main conveyor.

The foregoing as well as other objects and advantages will become apparent as the following specification is read in conjunction with the attached drawings in which:

Figure 1 is a perspective view of the combined endless conveyor and feeder trough in which the feeder trough is in an intermediate position in transition between lowered position and a folded-up position, Figure 2 is an elevation view of a portion of the conveyor and feeder trough of Figure 1 in which the feeder trough is in a fully lowered operative position, and Figure 3 is a view of the same portion of the apparatus shown in Figure 2, with the feeder trough in a fully folded and inoperative position upon the conveyor ready for transport by towing.

While the invention will be described and illustrated as being used with or for agricultural machinery, it is understood that the invention may be used equally well with any type of endless conveyor for which a feeder trough is desirable. While feeder troughs for endless conveyors of the type used in agricultural machinery are well known, these prior art devices have always been complicated of structure and cumbersome to handle. The device to be described is capable of being adjusted to its various desired positions by a child and is so constructed that it is extremely stable in all positions because of the novel balancing structure.

Referring now to the drawings and Figure 1 in particular, the reference numeral 10 indicates an endless conveyor of the type utilized in small grain elevators and the like. The endless conveyor 10 is composed of a plurality of interlocking sheet metal sections 12 to form a housing for the endless conveyor per se. The number of sections 12 is optional and depends upon the desired length of the conveyor 10. The housing sections 12 are made of sheet metal of sufficient gauge and strength to withstand the stresses normal to the operations to which the conveyor is to be subjected, but light enough in weight so that the entire device may be handled easily by one person in a manner to be described below. A pair of chains, suitably power driven and extending the entire length of the conveyor, have mounted between them a plurality of equally spaced conveyor flights or pushers 14. The housing sections 12 are each divided lengthwise into upper and lower sections in a manner well known in the art to provide a continuous partition surface or floor along which the flights 14 work.

The entire conveyor structure is cradled and mounted upon a wheeled carriage 16 for mobility and easy adjustment as to the desired angle of operation. The carriage 16 includes two sets of tubular struts 18 and 20 attached at their upper ends to the under side of the conveyor housing, and at their lower ends to an axle 22 on which are mounted the wheels 24 and 26. The upper or discharge end of the conveyor 10 is provided with a discharge funnel 28 and adjustable spout 30. The extreme lower end of the conveyor 10 is provided with a tow hitch bar 32 for use in towing the conveyor to any desired location.

To provide power for operating the conveyor, a small gasoline motor 34 is mounted on the under side of the lower conveyor housing section 12 in an engine mount that is capable of automatically maintaining a horizontal position. The motor 34 is connected by means of a belt 36 to a drive pulley 38 mounted on the side of the conveyor housing 12. The drive pulley 38 is connected by means of a chain to the conveyor drive sprocket 40. The chain and the drive sprocket 40 are covered by a safety cover 42 that is removable to provide access to the chain and drive sprocket 40.

In conveyors of the type just described, it is desirable and sometimes necessary to provide a feeder trough that will form a unitary structure with the conveyor apparatus and be capable of folding upon the conveyor for compactness and ease of transporting the entire structure upon the wheeled carriage 16. To this end there is provided a feeder trough 44 comprising a single housing 46 horizontally divided along its entire length in a manner similar to that of the main conveyor housing sections 12. The lower end 48 of the feeder trough housing 46 is bent upwardly as shown in Fig. 1.

The feeder trough 44 is provided with two drive chains (not shown) similar to those of the main conveyor 10, as well as conveyor flights or pushers similar to the flights 14 of the main conveyor 10. The feeder trough drive chains are spaced in like manner to that of the main conveyor chains and one of them may be connected to the power takeoff 38 or sprocket 40 by any suitable means. The feeder trough is hinged or pivoted to the main conveyor 10 in order that it may be adjusted and set to the desired angle relative to the conveyor. In order that the feeder trough may be pivoted or rotatable about a horizontal axis, the main conveyor housing is provided on each inner side thereof with a rigidly mounted heavy metal strap 50 through which passes a shaft 52 about which the feeder trough may pivot or rotate. The feeder chains are driven by sprockets on the axis 52, in turn driven by a chain 53 from sprocket 40, so that the drive remains connected for any position of the feeder trough.

The feeder trough balancing mechanism is such that when the trough is in its operative position lying flat upon the ground as illustrated in Figure 2, it can be folded into the position of Figure 3 by the easy effort of only one person. For this purpose there is secured on each side of the bent-up portion 48 of the feeder trough a heavy metal strap 54. Connected to the other ends of the metal straps 54 are the balancing springs 56 and 58. The spring 56 is connected by a heavy link chain 60 to a bracket 62 secured to the side of the conveyor housing 12. The spring 58 in a like manner is secured by means of a chain 64 to an identical bracket on the other side of the conveyor housing 12. The chains may be adjusted as to length by securing them to their brackets at different points along the length of the chains.

Across the under side of the bent-up portion 48 of the feeder trough 44, there is pivotally secured the base 66 of a triangular member 68 to which is attached at the apex thereof one end of a spring 70. The other end of the spring 70 is connected through a length of chain 72 to a cross member 74 rigidly mounted on the underside of the feeder trough section 46. Another chain 76 is connected between the apex of the triangular member 68 and the end of the tow hitch bar 32 as shown in Figures 1 and 3. The chain 76 is of such length that the spring 70 will not be under any tension until the feeder trough 44 is tilted upward at such an angle that the two springs 56 and 58 are about to be relieved of any tension and the feeder trough is about to fall over on the main conveyor 10. At this point the spring 70 is automatically brought under tension and permits the feeder trough to be lowered gently upon the main conveyor 10 as shown in Figure 3.

The two springs 56 and 58 are so proportioned that they support practically all of the weight of the feeder trough 44 when the trough is in the intermediate position shown in Figure 1, at an angle of approximately 45 degrees, and are under considerable tension when the feeder trough is in the operative position shown in Figure 2. In order to provide the correct balance by the two side springs 56 and 58 for various angles of the main conveyor 10 and the feeder trough 44, the chains 60 and 64 may be shortened or lengthened as needed. For example, if it is desired to operate the conveyor 10 in the elevated angular position shown in Figure 1, a few links may in effect be removed from each of the side chains 60 and 64. The links are in practice not actually removed, but the chains are effectively shortened or lengthened by making the end connection at different links. In a like manner, the hitch chain 76 may be lengthened or shortened to provide the proper tension in the hitch spring 70 for different angles of the conveyor 10.

A socket 78 is mounted on each side of the feeder trough housing 48 to receive therein a stand 80. The stands 80 rest upon the main conveyor 10 when the feeder trough is in a fully folded position as shown in Figure 3.

As shown clearly in Figure 1, when the main conveyor is in operative position at an angle of 45 degrees with the vertical, and the feeder trough 44 is almost perpendicular to the main conveyor, the two side springs 56 and 58 are under tension and support practically the entire weight of the feeder trough. With the main conveyor in the same position, but with the feeder trough in a horizontal position resting on the ground as illustrated in Figure 2, the two side springs 56 and 58 are under considerable tension. However, when the feeder trough is lifted up and rotated about the axis 52, a point is reached where the side springs 56 and 58 are relieved of tension and begin to go slack. At this point, the slack is taken up in the chains 72 and 76, and the hitch spring 70 becomes subject to tension. As the feeder trough continues to be rotated about the axis 52, the spring 70 comes under more load while the side springs 56 and 58 become completely slack as shown in Figure 3, until the feeder trough comes to rest in the final folded position shown in Figure 3.

By the proper choice of springs and chain lengths it is possible to provide easy foldablity of the feeder trough for virtually all desired angles of operation of the main conveyor with reference to ground. Under actual test conditions, a 10-foot feeder trough of the construction described has been raised and lowered into the desired positions by a 10-year-old child.

Thus it is seen that this invention provides a combination conveyor and feeder trough which is readily movable, easily adjusted for operation under a variety of different conditions and may be changed readily to different operating positions by a minimum of effort. The cost of construction of the combined conveyor and feeder trough is greatly reduced because of the simplified structure utilized, and the device may be used for a variety of operations. While the invention has been illustrated and described as an agricultural machine, it is obvious that the construction may be used on other types of endless conveyors and feeder troughs for such conveyors.

Having described the invention and explained its operation, it is obvious that some changes may be made in the illustrated embodiment without departing from the scope of the invention as set forth in the appended claim.

What is claimed is:

In combination, a main conveyor capable of operation in a variety of vertically tilted positions, a feeder trough pivotally connected to the lower end of said main conveyor and movable through a substantial vertical angular range with respect to said main conveyor, including positions on both sides of the vertical through their pivotal connection, a first spring-and-chain assembly connected from said feeder trough to a point on said main conveyor lying above the pivotal connection, and a second spring-and-chain assembly connected from said feeder trough to a point on said main conveyor lying below the pivotal connection; the spring and chain of said second assembly being connected end to end, and a rigid member pivoted on a horizontal axis to the underside of said feeder trough adjacent said pivotal connection, the free end of said rigid member being secured to the joining ends of the spring and chain of said second assembly; the effective lengths of said assemblies, when relaxed, being such as to bring their respective springs into counterbalancing action as the feeder trough is moved from one extremity of its range to the other.

References Cited in the file of this patent

UNITED STATES PATENTS

| | | |
|---|---|---|
| 449,447 | Kirkpatrick | Mar. 31, 1891 |
| 1,190,564 | Lindsay | July 11, 1916 |
| 2,577,328 | Hyman | Dec. 4, 1951 |

UNITED STATES PATENT OFFICE

CERTIFICATE OF CORRECTION

Patent No. 2,921,666         January 19, 1960

Samuel K. Stauth

It is hereby certified that error appears in the above numbered patent requiring correction and that the said Letters Patent should read as corrected below.

In the grant, lines 2 and 11, and in the heading to the printed specification, lines 3 and 4, name of assignee, for "Moyrath Machinery Co., Inc.", each occurrence, read -- Mayrath Machinery Co., Inc. --.

Signed and sealed this 19th day of July 1960.

(SEAL)
Attest:
KARL H. AXLINE
Attesting Officer

ROBERT C. WATSON
Commissioner of Patents